Jan. 17, 1961 V. KROUPA 2,968,744
CIRCUIT ARRANGEMENT FOR THE GLOW-DISCHARGE TUBE INDICATION OF A DECIMAL TUBE COUNTER
Filed Oct. 22, 1957
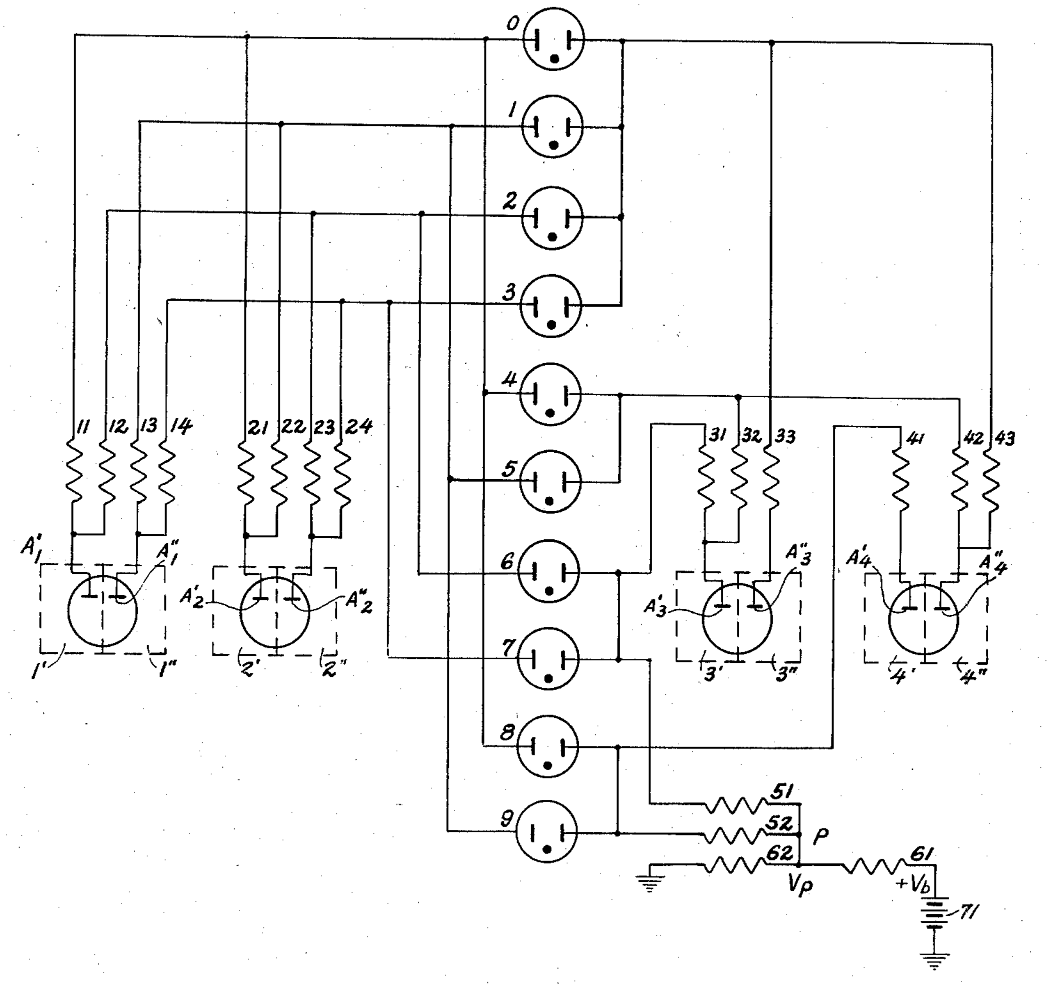
INVENTOR.
VENCESLAV KROUPA
BY Richard Low
AGENT

United States Patent Office 2,968,744
Patented Jan. 17, 1961

2,968,744

CIRCUIT ARRANGEMENT FOR THE GLOW-DISCHARGE TUBE INDICATION OF A DECIMAL TUBE COUNTER

Věnceslav Kroupa, Prague, Czechoslovakia, assignor to Tesla, narodni podnik, Prague, Czechoslovakia Filed Oct. 22, 1957, Ser. No. 691,661
2 Claims. (Cl. 315—84.5)

The object of the invention is to provide a definite and simple visual indication of any one of the ten stable states of a decimal counter circuit which includes four pairs of tubes. The indication is effected by means of ten glow-discharge tubes. The above, and other objects, features and advantages of the invention will be apparent in the following detailed description of an illustrative embodiment thereof which is to be read in connection with the accompanying drawing forming a part hereof, and wherein:

The figure is a diagrammatic representation of the bistable flip-flops of a conventional decimal counter to which there has been added a device embodying this invention for visually indicating the state of the counter.

Referring to the drawing in detail, it will be seen that the conventional counter circuit includes four bistable flip-flops 1′—1″, 2′—2″, 3′—3″ and 4′—4″, each of which may be of the well known type shown in U.S. Letters Patent No. 2,749,437, issued June 5, 1946, to W. G. Parr.

The operation of a typical counter circuit is as follows: In the so-called initial or "zero" state, all the pairs of tubes are in the state "0" which means, for example, that all the tubes 1′, 2′, 3′, 4′ are cut off, while all the tubes 1″ to 4″ are conducting. If a voltage pulse is applied to the input of the first stage, the state of the first pair of tubes is changed in such a manner that the tube 1′ becomes conducting while the tube 1″ is blocked. This state is referred to, for example, as "X." The next pulse changes the first stage back to its original state, and at the same time the pulse produced by the change of state of the first stage changes the second stage to the state "X." Further pulses reverse the state of the individual stages in such a manner that the reversal of a preceding stage from the state "X" to the state "0" has the effect of reversing the following stage. It is noted, however, that if no auxiliary circuits or special connections are used, the four pairs of tubes do not revert to the original state "0, 0, 0, 0" until after the sixteenth pulse.

In the counter circuit with which the visual indicating arrangement embodying this invention is to be used, all the pairs of tubes revert to the zero position after the tenth pulse. This is achieved by providing a blocking circuit (not shown), which may be formed in general by a tube, diode or the like, and which is connected between the tubes 2′ and 4′. Blocking feedbacks may be used for the same purpose. The operation of the counter circuit is indicated in the following table:

| | | | | |
|---|---|---|---|---|
| 0 | 0 | 0 | 0 | 0 |
| 1 | X | 0 | 0 | 0 |
| 2 | 0 | X | 0 | 0 |
| 3 | X | X | 0 | 0 |
| 4 | 0 | 0 | X | 0 |
| 5 | X | 0 | X | 0 |
| 6 | 0 | X | X | 0 |
| 7 | X | X | X | 0 |
| 8 | 0 | 0 | 0 | X |
| 9 | X | 0 | 0 | X |
| 10 | 0 | 0 | 0 | 0 |

The advantage of using a blocking circuit rather than feedback consists in that the minimum time interval between the pulses is limited only by the transient phenomena in the binary stages; feedbacks, on the other hand, lead to additional pulses which mean delays. It follows from this that blocking circuits are used for the most rapid stages in decimal counters. A further important advantage for many applications consists in that the decade counter operates in a binary manner from the zero to the ninth position. The tenth pulse brings it back to the original position.

Not all the known decimal counters provided with a blocking circuit are suitable for decimal indication. In many of these known circuits, hitherto known methods of decimal indication are very difficult to carry out and involve heavy demands on the indicator glow-discharge tubes and on the stability of the supply voltages. Particularly for a decimal counter circuit working in accordance with the table given, the opinion was generally held that it was not suitable for decimal light-indication because for "0" and "1" the indicator glow-discharge tubes have to be connected up through resistances between the junction of three anodes and a further anode of the tubes of the individual stages. It is true that indication by means of four light signals in accordance with the binary number system is a simple solution of this difficulty, but such indication is very troublesome to read.

The mentioned difficulties are overcome in illustrative embodiments of the present invention.

More specifically, an illustrative embodiment of this invention includes glow-discharge tube means for indicating the state of a decimal counter which includes four bistable flip-flop circuits, each of the flip-flop circuits including two electron discharge tubes having anodes. The indicating means comprises ten glow-discharge tubes which are divided into first and second groups respectively containing six and four glow-discharge tubes. Each glow-discharge tube of the first group has one electrode thereof connected through resistors to the anodes of tubes in two different flip-flop circuits and its other electrode connected through resistors to anodes of tubes in the other two flip-flop circuits. Each glow-discharge tube of the second group has one electrode thereof connected through resistors to the anodes of tubes in two different flip-flop circuits and its other electrode connected through a resistor to the anode of a tube in one of the other two flip-flop circuits and also through a resistor to a point having a potential that is equal to the potential at an anode of a tube in one of the flip-flop circuits that is either conducting or non-conducting.

The interconnection pattern between the glow-discharge tubes and their associated circuitry may be represented as follows:

Glow-discharge tube "0" connected between $A'_1A'_2—A''_3A''_4$

Glow-discharge tube "1" connected between $A''_1A'_2—A''_3A''_4$

Glow-discharge tube "2" connected between $A'_1A''_2—A''_3A''_4$

Glow-discharge tube "3" connected between $A''_1A''_2—A''_3A''_4$

Glow-discharge tube "4" connected between $A'_1A'_2—A'_3A''_4$

Glow-discharge tube "5" connected between $A''_1A'_2—A'_3A''_4$

Glow-discharge tube "6" connected between $A'_1A''_2—A'_3P$

Glow-discharge tube "7" connected between $A''_1A''_2—A'_3P$
Glow-discharge tube "8" connected between $A'_1A'_2—A'_4P$
Glow-discharge tube "9" connected between $A''_1A'_2—A'_4P$ where $A'_1$, $A'_2$, $A'_3$, and $A'_4$ are the respective anodes of the tubes in the flip-flops which initially are nonconducting, viz., the tubes 1', 2', 3', and 4', and $A''_1$, $A''_2$, $A''_3$ and $A''_4$ are the respective anodes of the tubes in the flip-flops which initially are conducting, viz., the tubes 1", 2", 3" and 4".

According to the invention, the glow-discharge indicator tubes are always connected up, through resistances, between two pairs of anodes. In such a circuit, the voltage "$Vd$" between the terminals of an indicator glow-discharge tube have any one of the following values:

$$1/Vd=0$$

if the potentials at all four anodes are the same or if there is a potential difference between the anodes connected to one glow-discharge tube electrode and, also, a potential difference between the anodes connected to the other glow-discharge tube electrode, these differences being, of course, the same since by definition the anode of a bistable flip-flop can exist only at one or the other of two discrete potential levels;

$$2/Vd=Va$$

where $Va$ represents the change in voltage at the anode of a tube when the tube undergoes a change of state i.e. a transition from a conducting to a non-conducting state or vice versa, if the two anodes connected to one electrode of a glow-discharge tube are at the same potential level which is, however, different from that of the potential level of each of the two anodes connected to the other glow-discharge tube electrode;

$$3/Vd=Va/2$$

if one of the four anodes connected to the electrodes of a given glow-discharge tube is at a potential level different from that of the other three anodes connected thereto, which means, of course, in view of the binary nature of the anode levels, that the potential levels of the other three anodes are equal to each other.

Note that in the case of a glow-discharge tube one of whose electrodes is connected to the point $p$, the potential $V_p$ may be substituted in the above relationships for the potential level of one anode.

Furthermore, note that a glow-discharge tube is lighted only if the potential difference $Vd$ thereacross is equal to $Va$, and is not lighted if the potential difference thereacross is $Va/2$ or 0.

In comparison with the prior art, where the indicator bridge is arranged between one anode on the one hand and three anodes on the other, and where the voltage $V_d$ may have the values 0, $V_a/3$, $2V_a/3$ and $V_a$, the advantages of the circuit according to the invention consist in that the voltage difference between the state when the glow-discharge tube glows and when it does not glow, is much greater, as a result of which the requirements as regards the tolerances both for the feed voltages and for the components used, such as resistances, electronic tubes and glow-discharge tubes, are lessened.

The auxiliary potential $V_p$, which equals either the potential on the anodes of the tubes in the decimal counter which conduct current or the potential on the anodes of the tubes thereof which do not conduct current at a given time (depending on the interconnection pattern employed to connect the glow-discharge tubes to the flip-flop anodes) is included in the novel circuit arrangement described herein for the following reason. If the electrodes of all the glow-discharge tubes were respectively connected through separating resistors between pairs of tube anodes, each anode being associated with a different flip-flop, then in the state "6" of the counter the glow tube designated "9" would also be lit, and in the state "7" the glow tube "8" would also be lit, and vice versa. This would, of course, be undesirable, and is due to the fact that in the states "6" and "9," and "7" and "8," the conductive and non-conductive conditions of all tubes are exactly interchanged, as is seen from the table above indicating the binary working code.

In order to obtain a definite and unambiguous indication of each state of the decimal counter, the symmetry of the connections of the indicating tubes "6" and "9" is disturbed in that one electrode of each indicating tube is connected through a separating resistor to point $p$ of potentiometer 61, 62, and to one flip-flop anode, the second electrode of each indicating tube being connected through a separating resistor between two further anodes, all three anodes belonging to different binary pairs. The symmetry of the connections of the glow tubes "7" and "8" is similarly disturbed.

The glow-discharge tubes are always connected up between two pairs of anodes or, instead of to one anode, the glow-discharge tube may be connected to the point of the auxiliary potential $V_p$, as is the case with the glow-discharge tubes 6 to 9. This auxiliary potential is derived from the potential $V_b$ by means of a voltage divider. The drawing shows that this circuit is simple and does not permit any ambiguity in the indication. Referring more specifically to the drawing, it will be seen that one electrode of each of glow-discharge tubes 0, 4 and 8 is connected, by way of resistance 11 and 21, to the anodes $A'_1$ and $A'_2$, respectively, while one electrode of each of glow-discharge tubes 1, 5 and 9 is connected, by way of resistances 13 and 22, to anode $A''_1$ and anode $A'_2$, respectively. Similarly, one electrode of each of glow-discharge tubes 2 and 6 is connected, by way of resistances 12 and 23, to anodes $A'_1$ and $A''_2$, respectively, while one electrode of each of glow-discharge tubes 3 and 7 is connected, by way of resistances 14 and 24, to anodes $A''_1$ and $A''_2$, respectively. The other electrodes of glow-discharge tubes 0, 1, 2 and 3 are all connected, by way of resistances 33 and 43, to the anodes $A''_3$ and $A''_4$, respectively, while the other electrodes of glow-discharge tubes 4 and 5 are both connected, by way of resistances 32 and 42, to the anodes $A'_3$ and $A''_4$, respectively. Finally, the other electrodes of glow-discharge tubes 6 and 7 are both connected by way of a resistance 31 to the anode $A'_3$ and, by way of a resistance 51, to a point $p$, while the other electrodes of glow-discharge tubes 8 and 9 are both connected, by way of a resistance 41, to the anode $A'_4$, and, by way of a resistance 52, to the point $p$.

The point $p$ has a potential of $V_p$ which is achieved by the provision of resistances 61 and 62 forming a potentiometer or voltage divider connected across a voltage source 71. As previously mentioned, the value of the potential $V_p$ at point $p$ may be equal to that at an anode of a conducting flip-flop tube. Preferably, all of the above enumerated resistances connected between the electrodes of the several glow-discharge tubes and the flip-flop anodes have the same values which are also equal to the values of the resistances 51 and 52, while the resistances 61 and 62 have values that are selected so as to provide the desired potential at the point $p$.

By means of the aforementioned separating resistors there is supplied to the electrodes of the glow-discharge tubes 0 through 9 a voltage which for equivalued separating resistors is exactly equal to one-half of the voltage difference between the anodes of the tubes between which the electrodes of a glow tube is connected. The same applies also to the potential of the electrodes of an indicating glow tube whose one electrode is connected between the anode of a flip-flop tube and the point $p$ of the potentiometer 61, 62, due to the fact that in the illustrative circuit arrangement the voltage $V_p$ is equal to the voltage on the anode of a tube which conducts current or, alternatively, to the voltage on the anode of a tube which does not conduct current. In this manner there is produced between the electrodes of each indicating glow tube a potential difference $Vd$. For example, there is obtained across the terminals of the glow-discharge tube 0 the absolute value of the potential difference $$Vd=\frac{VA'_1-VA'_2}{2}-\frac{VA''_3-VA''_4}{2}$$

where $VA'_1$, $VA'_2$, $VA''_3$ and $VA''_4$ are the potentials on the anodes of the tubes 1', 2', 3'', and 4'', respectively.

Although an illustrative embodiment of the invention has been described in detail herein with reference to the accompanying drawing, it is to be understood that the invention is not limited to that precise embodiment, and that various changes and modifications may be effected therein without departing from the scope or spirit of the invention, except as defined in the appended claims.

What I claim is:

1. A visual indicating arrangement for showing the state of a decimal counter of the type including first, second, third and fourth bistable flip-flop circuits each having electron tubes with anodes that are alternatively in conducting and non-conducting states during operation of the counter; said visual indicating arrangement comprising a first group of six glow-discharge tubes each having two electrodes, a second group of four glow-discharge tubes each having two electrodes, means connecting one of said electrodes of each of said glow-discharge tubes in said first and second group to anodes of two electron tubes in said first and second flip-flop circuits, respectively, and having an individual resistor interposed in each connection to each anode, means connecting the other of said electrodes of each of said glow-discharge tubes in said first group to anodes of two electron tubes in said third and fourth flip-flop circuits of the counter and also having an individual resistor in each connection to each anode, a source of potential equal to the potential at one of said anodes in one of said states of the latter, and means connecting the other of said electrodes of each of said glow-discharge tubes in said second group to both said source of potential and the anode of an electron tube in one of said third and fourth flip-flop circuits and also having a resistor in each connection to said source of potential and to each anode.

2. A visual indicating arrangement for showing the state of a decimal counter of the type including first, second, third and fourth bistable flip-flop circuits each having electron tubes with anodes that are alternatively in conducting and non-conducting states during operation of the counter; said visual indicating arrangement comprising first and second groups of glow-discharge tubes totaling ten in number and each having two electrodes, means connecting one of said electrodes of each of said glow-discharge tubes in said first group to an anode of an electron tube in said first flip-flop circuit and having an individual resistor interposed in each connection to each anode, means also connecting said one electrode of each of the glow-discharge tubes in said first group to an anode of an electron tube in one of said second, third and fourth flip-flop circuits and having an individual resistor interposed in each connection to each anode, means connecting the other of said electrodes of each of the glow-discharge tubes in said first group to anodes of two electron tubes in different flip-flop circuits constituting the remaining two of said second, third and fourth flip-flop circuits and also having an individual resistor in each connection to each anode, a source of potential equal to the potential at one of said anodes in one of said states of the latter, means connecting one of the electrodes of each of said glow-discharge tubes of said second group to both an anode of an electron tube in one of said flip-flop circuits and to said source of potential and having a resistor in each connection to said source of potential and to each anode, and means connecting the other electrode of each of said glow-discharge tubes of said second group to anodes of two electron tubes in different flip-flop circuits from among the remainder of said flip-flop circuits and also having an individual resistor interposed in each connection to each anode, each of said glow-discharge tubes of said second group having an electrode thereof connected to an anode of an electron tube of said first flip-flop circuit by way of said means connecting the electrodes of said glow-discharge tubes of said second group.

References Cited in the file of this patent

UNITED STATES PATENTS

| | | |
|---|---|---|
| 2,402,372 | Compton | June 18, 1946 |
| 2,549,779 | Crenshaw | Apr. 24, 1951 |
| 2,616,627 | Holden | Nov. 4, 1952 |